United States Patent
Borst

(10) Patent No.: US 7,232,541 B2
(45) Date of Patent: Jun. 19, 2007

(54) METHOD OF VACUUM THERMOFORMING A CONTAINER

(76) Inventor: Rodney D. Borst, 5713 Vineyard Rd., Oregon, WI (US) 53575

( * ) Notice: Subject to any disclaimer, the term of this patent is extended or adjusted under 35 U.S.C. 154(b) by 140 days.

(21) Appl. No.: 10/051,566

(22) Filed: Jan. 18, 2002

(65) Prior Publication Data
US 2002/0158370 A1    Oct. 31, 2002

Related U.S. Application Data

(63) Continuation of application No. PCT/US01/40619, filed on Apr. 27, 2001.

(51) Int. Cl.
*B29C 51/10* (2006.01)

(52) U.S. Cl. .................. 264/553; 264/163; 264/318; 264/334; 425/443; 425/444; 425/388

(58) Field of Classification Search ............ 264/553, 264/163, 318
See application file for complete search history.

(56) References Cited

U.S. PATENT DOCUMENTS 3,418,690 A * 12/1968 Edwards ............... 425/289
4,495,135 A * 1/1985 White .................. 264/553
4,822,553 A * 4/1989 Marshall ............... 264/292

\* cited by examiner

*Primary Examiner*—Edmund H. Lee
(74) *Attorney, Agent, or Firm*—Woodard, Emhardt, Moriarty, McNett & Henry LLP

(57) ABSTRACT

A method of thermoforming shells so that their cut lips face inward toward the shells permits the production of a number of novel thermoformed products having superior nesting and de-nesting qualities and having the ability to fit together to produce a variety of closed shell forms.

9 Claims, 4 Drawing Sheets

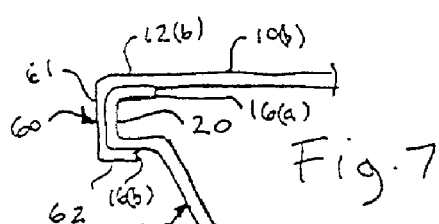
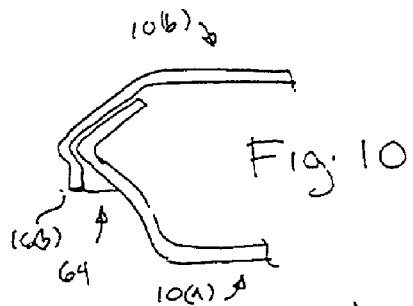
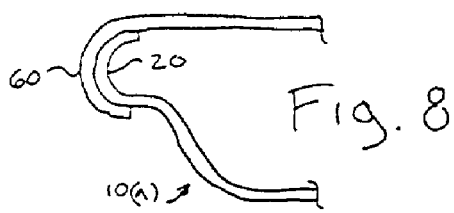
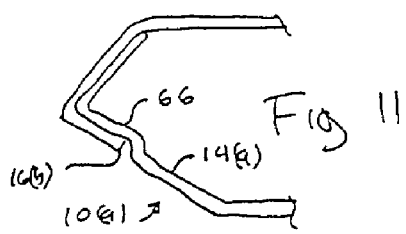
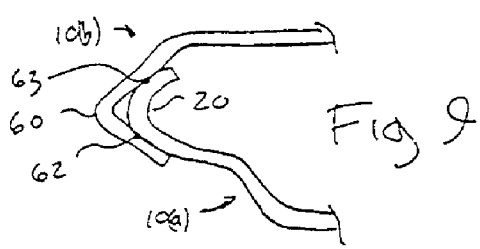
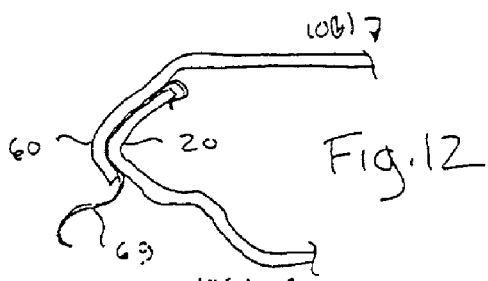
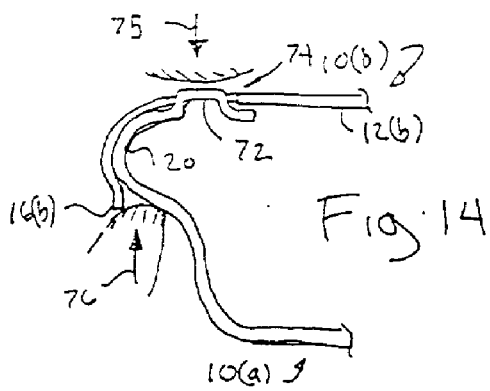
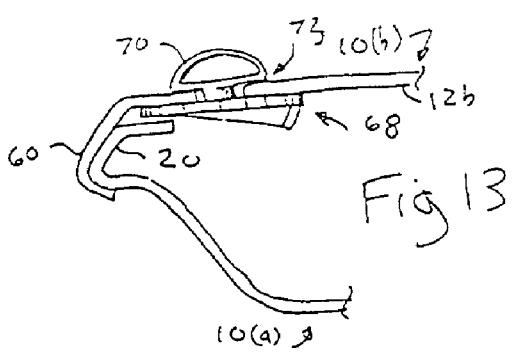
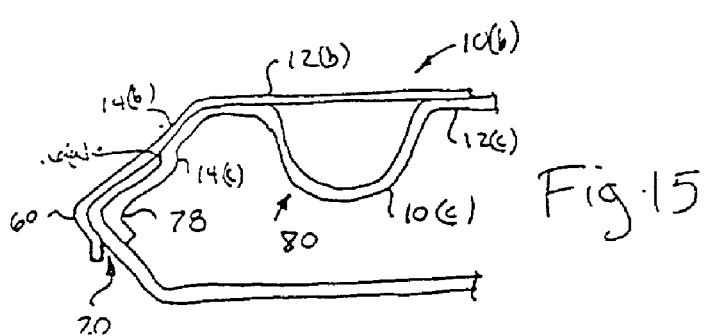

METHOD OF VACUUM THERMOFORMING A CONTAINER

CROSS-REFERENCE TO RELATED APPLICATIONS

This application is a continuation of international application number PCTUS01/40619, filed Apr. 27, 2001, now pending.

BACKGROUND OF THE INVENTION

The invention relates to thermoforming and thermoformed containers and in particular to a thermoformed container having an inwardly extending cut lip.

Thermoforming is a process of heating a thermoplastic sheet to working temperature and then forming it to a finished shape by means of heat or pressure. In a typical thermoforming system set up for continuous forming, the sheet is heated in an oven then moved to a forming press. There the softened plastic material is forced against the mold surface by vacuum or air pressure until it sets. During the forming process, a sheet clamp may hold the sheet flat at the edges of the mold. A single mold may be used or matched male and female molds may be used to assist the forming process.

When the material has set, it may be moved to a trim press where a steel rule or matched punch and die cut the part from the sheet. The use of separate dies can cause some misregistration between the molded part and the cutting die, and accordingly a cut in-place configuration may be used where the sheet is formed and trimmed in the same station.

Thermoforming can produce extremely thin-walled parts with low tooling costs. Nevertheless, there are a number of limitations to the thermoforming process. First, the cut lip of the flange may give the products an unfinished look. To the extent that the cut lip reveals the thinness of the material, packaging using thermoforming techniques may look inexpensive.

Even with cut in-place systems, it is difficult to control the dimension and alignment of the cut lip, limiting the application of thermoforming in products where a tight tolerance must be held on this outer dimension.

The light weight and low cost of thermoformed products make it critical that the products be nested for economical shipping. Nevertheless, the implicit symmetry to a thermoformed sheet causes nested products to stack tightly, making de-nesting a problem.

The cut lip of the thermoformed product interferes with attempts to create a closed container with tight sealing.

BRIEF SUMMARY OF THE INVENTION

The present invention provides a novel thermoforming process that permits the construction of thermoformed containers where the cut lip extends inward rather than outward as is typical. As a result, a wide variety of new thermoformed products and products having a radically different outward appearance may be produced. By combining the inwardly facing cut lip with an outwardly extending rim, closed stronger containers with substantially smooth outlines may be easily produced.

Specifically, the present invention provides a method of producing thermoformed shapes with inwardly extending flanges involving the positioning of a heated sheet of thermoplastic material over a cavity having an upper lip and having an undercut portion beneath the lip. The heated sheet of thermoplastic is then drawn down over the upper lip and into the cavity and into the undercut portion. Next, a cutting die is passed into the upper lip to separate the thermoplastic material at the upper lip and the cavity is separated at the undercut portion to extract the formed thermoplastic material.

Thus, it is one object of the invention to provide a method of manufacturing thermoformed containers that does not require the product to have an outwardly extending lip.

The process produces a novel container having a base surrounded by integrally formed side walls extending upward to a cut lip, the walls and base formed of a single thermoplastic sheet and defining a volume, and the cut lip extending inward about the volume.

It is one object of the invention to provide a new thermoformed product without the normal outwardly extending cut lip. By facing the cut lip inward, the outer dimensions of the shape are accurately controlled by the cavity size, permitting designs with much greater precision in outside dimension. The cut lip is also made less visible, providing a more substantial, three-dimensional visual appearance to the manufactured product.

The upwardly extending walls may include a ridge below the cut lip, the ridge protruding away from the volume. The ridge may be sized to support the container on a lower surface of the ridge against a cut lip of a second identical container with the bases of the two containers spaced apart when the containers are nested together.

Thus it is another object of the invention to provide a thermoformed shape that may be nested in a naturally spaced apart configuration amenable to de-nesting. The ridge and inwardly facing cut lip allows an arbitrary separation between the thermoformed parts when nested, a spacing otherwise difficult to achieve in thermoforming.

The ridge may have at least one wall obtusely angled with respect to an adjoining portion of the side wall so that a gap is formed between the ridges of the two containers when they are nested.

It is yet another object of the invention to provide an ample gap between containers for automatically or manually de-nesting the containers.

The combination of inwardly extending cut lip and outwardly extending ridge permits a closed thermoformed container to be produced in which a second container, having a ridge sized to receive and fit over the ridge of the first container, may be thereby attached to the first container.

Thus it is another object of the invention to provide a closed container produced of thermoformed parts having positive attachment between the components and good sealing. The interfitting of the two ridges provides an attachment between two thermoformed shells that is substantially seamless to the eye.

Conversely, one of the shells may have a vertically extending flange to permit easy separation of the two shells when one shell is used as a lid or the like. One of the shells may incorporate a terrace beneath the first ridge in the side wall, displacing the ridge inwardly by substantially the thickness of the thermoplastic sheet. The terrace may be positioned near the cut lip of the engaging second shell when the two shells are placed together, thereby causing that cut lip to lie substantially flush with the side wall and to resist separation of the shells by a catching of the cut lip.

Thus another object of the invention is to provide a tamper resistant seal between two thermoformed shells fastened into a closed container.

The foregoing and many other objects and advantages of the invention will appear from the following description. In this description, reference is made to the accompanying drawings which form a part hereof and in which there is shown by way of illustration an preferred embodiment of the invention. Such embodiment does not necessarily represent the full scope of the invention, however, and reference must be made therefore to the claims for interpreting the scope of the invention.

BRIEF DESCRIPTION OF THE DRAWINGS

FIG. 6 is a fragmentary view of FIG. 5 showing the effect of the shape of the ridge in providing a gap between containers suitable for a de-nesting pawl or the like;

FIG. 7 is a cross-sectional fragmentary view of the upper edge of a container produced by the present invention attached to a second container also according to the present invention to connect together at interengaging ridges into a single unit;

FIG. 8 is a figure similar to that of FIG. 7 showing the use of a hemicircular rather than rectangular interengaging ridges;

FIG. 9 is a figure similar to that of FIGS. 7 and 8 showing the use of interengaging ridges with two different shapes to provide dual lines of sealing between the first and second containers;

FIG. 10 is a figure similar to FIGS. 7 through 9 where the second container has an vertically rather than inwardly extending flange to assist in separating the containers;

FIG. 11 is a figure similar to FIGS. 7 through 10 having a recessed terrace for receiving the inwardly extending cut lip of the second container so as to provide a seamless outer profile that is tamper resistant;

FIG. 12 is a figure similar to FIGS. 7 through 11 showing placement of a flexible release tab between the two containers that may be pulled upward to release the containers from one another;

FIG. 13 is a figure similar to FIGS. 7 through 12 showing the use of a rotatable cam element for separating the interengaging ridges of the two containers;

FIG. 14 is a figure similar to FIGS. 7 through 12 showing the position of a cut-out near the ridge of the second container and an embossment near the ridge of the first container, extending through the cut-out when the containers are assembled together, permitting opposed finger pressure to release the containers from one another;

FIG. 15 is a figure similar to FIGS. 7 through 13 showing a three-part container having an insert for supporting a product against an upper clear container base;

DETAILED DESCRIPTION OF THE PREFERRED EMBODIMENT

Figure 1:
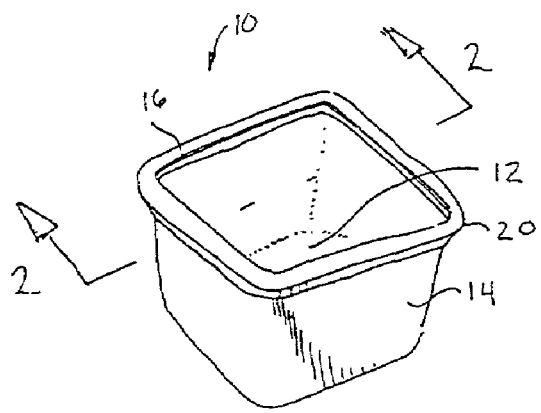
FIG. 1 is a perspective view of a thermoformed container produced according to the present invention, having an inwardly extending cut lip.
Figure 2:
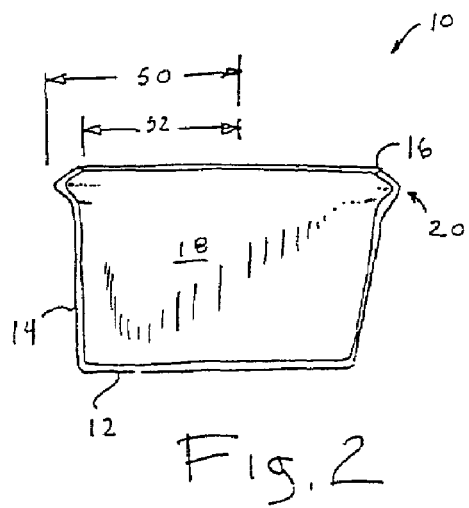
FIG. 2 is a cross-sectional view of the container of FIG. 1 taken along line 2—2 of FIG. 1 showing the inwardly extending cut lip and an outwardly extending ridge positioned beneath the cut lip.

Referring now to FIGS. 1 and 2, a thermoformed container 10 includes a generally planar base 12 attached at its periphery to upstanding side walls 14 which terminate at an upper cut lip 16. The base 12 and walls 14 enclose a volume 18 with the cut lip 16 generally extending inward about the volume 18. In a conventional thermoformed product, the cut lip 16 would extend outward away from volume 18 so as to be clear from the walls 14 for a die cutting operation. Positioned beneath the cut lip 16 is a ridge 20 extending about the circumference of the upper edge of the container 10 and protruding outward away from the volume 18.

Figure 3:
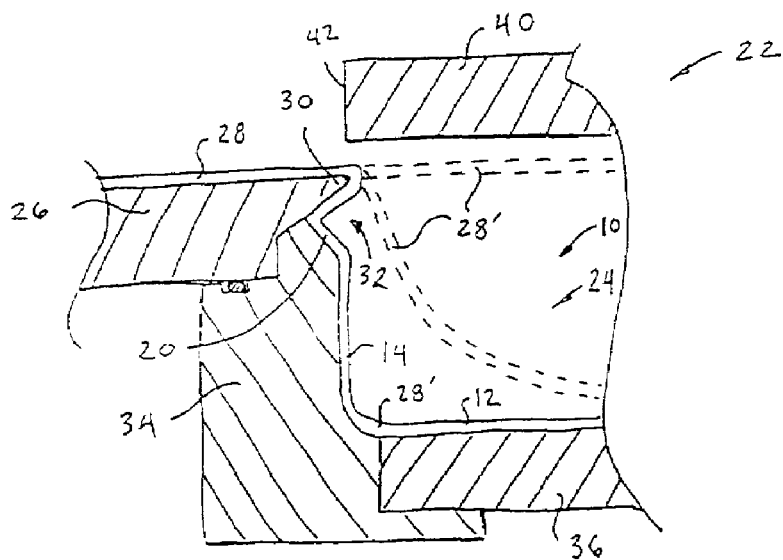
FIG. 3 is a fragmentary cross-sectional view of a thermoforming machine for producing the container of FIGS. 1 and 2, showing the drawing of a sheet of thermoplastic material into a cavity having an undercut portion.

Referring now to FIG. 3, the container 10 may be formed on a thermoforming machine 22 having a cavity 24 generally conforming in shape to the outer surface of the container 10. The cavity 24 is positioned to provide a recess under a forming table 26, the latter which provides a planar upper surface across which a sheet of thermoplastic material 28 may slide.

The heated sheet 28 may be drawn down into the cavity 24 as shown by dotted outlines 28' by means of a relative vacuum provided beneath the sheet 28' in the cavity 24 through one or more orifices or nested by another portion of the machine (not shown).

In the drawing operation, the sheet 28' is formed over an upper lip 30 defining the edge of the cavity 24. The cavity 24 is formed from three mold components: the lip 30 (being part of the table 26) which also provides a first-half of an undercut portion 32, a second mold portion 34, which abuts the underside of the lip 30 and provides a second half of the undercut portion and a surface shaping the side walls 14, and a third mold portion 36 which defines the shape of the base 12 and may move independently of the second mold portion 34 as will be described. The undercut portion 32 forms the ridge 20 in the finished container.

The interface between the lip 30 and the second mold portion 34 is aligned with the extreme outermost extent of the ridge 20 to permit the container 10 (to be formed in the cavity 24) to be removed from the cavity 24 by a separation of lip 30 and the second mold portion 34. During the forming process, a die 40 is positioned above the cavity 24 with a vertical cutting edge 42 aligned with the lip 30.

Figure 4:
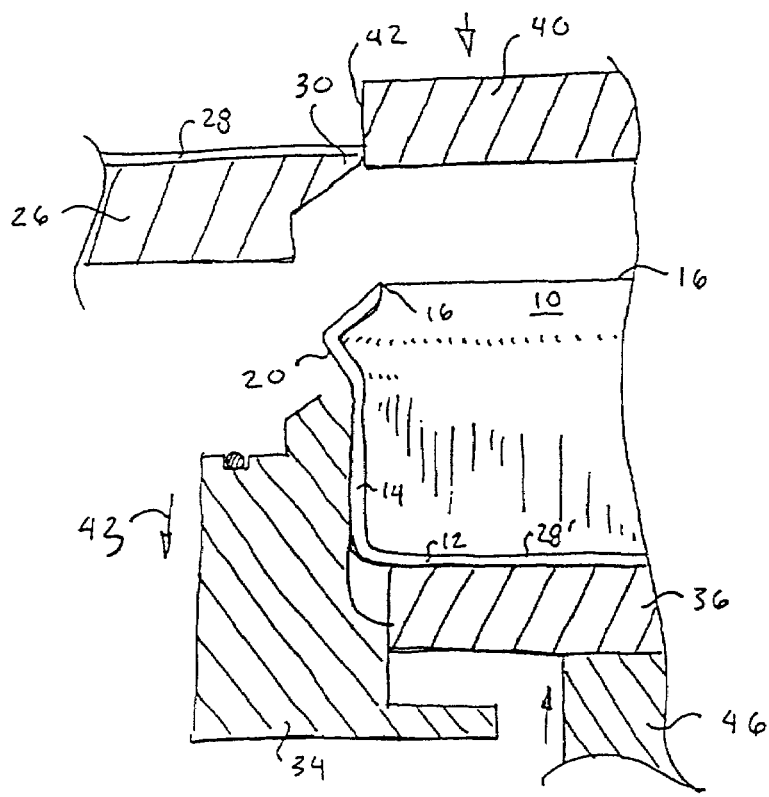
FIG. 4 is a second view of the machine of FIG. 3 showing a die cutting of the cut lip of the container of FIGS. 1 and 2 as produced in the thermoforming machine, with a retraction of portions of the cavity to release the part therefrom.

Referring now to FIG. 4, after the sheet 28 has been drawn down to conform with the inner surfaces of the cavity 24, including being drawn into the undercut portion 32, it is allowed to cool below its glass transition temperatured thus ensuring that it will retain its shape once pressure has been released. At this time, the mold portion 34 and 36 move downward together as indicated by arrow 43 while die 40 cuts through sheet 28 at lip 30 releasing the container 10 from sheet 28.

Once the sheet 28 has been cut through by the shearing action between lip 30 and cutting edge 42, die 40 stops moving whereas mold portions 34 and 36 continue moving downward until the cut lip 16 is clear from the structure of the lip 30. At this time, mold portion 34 continues downward motion, but mold portion 36 is stopped by ejector peg 46 pushing upward on mold portion 36 with respect to mold portion 34 ejecting the container 10 from the mold cavity 24. The container 10 may then be moved laterally into a collection bin (not shown).

Die 40 then moves upward and sheet 28 again moves out over the cavity 24 which is reassembled by the upward motion of mold portions 34 and 36. The splitting of the portions 34 and 30 at the outermost extent of the ridge 20 allows removal of the container 10 from the cavity 24 without interference with the mold components.

Referring again to FIG. 2, the dimension 50 from the center of the container 10 to its outermost extent, representative of an outside dimension of the container lo, will be accurately controlled by the dimensions of the cavity 24. The accuracy of dimension 52, representing the distance between the center of the container 10 and the cut lip 16, need not control of the closeness of fit between the container and the cover. Accordingly, designs that require a precise outside dimension and accurately located outside rim will be possible with the present invention. Furthermore, because the cut lip 16 is displaced from the outside dimension, the upper edge of the container 10 presents a smooth profile suitable for many containers as will be described. The cut lip 16 may not be smooth.

Figure 5:
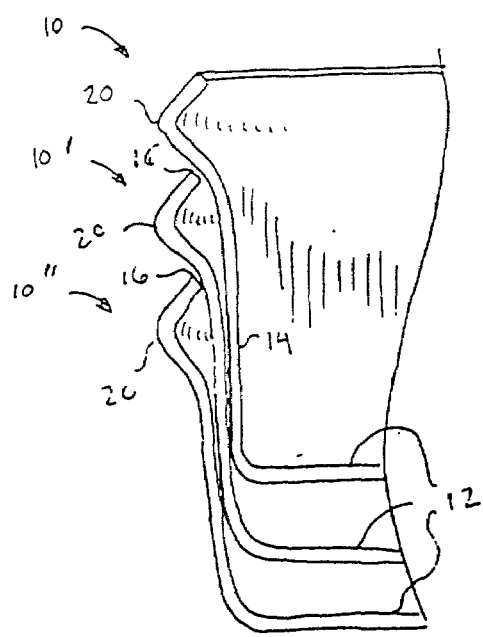
FIG. 5 is a fragmentary cross-section of the container of FIG. 2 when nested with other similar containers showing the action of the ridge and cut lip in holding the containers with their bases in separation.
Figure 6:
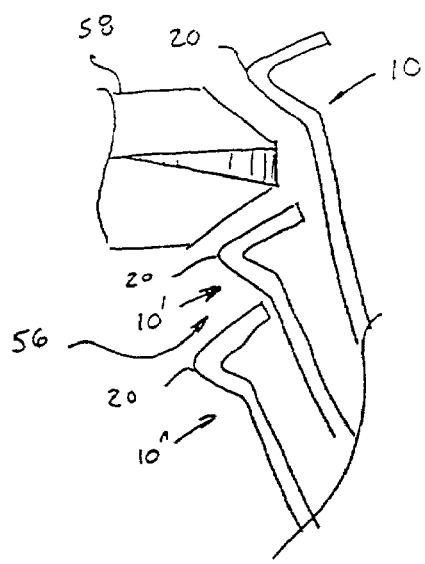

Referring now to FIG. 5, one aspect of the present invention is that it permits the design of containers 10 that may be readily de-nested after they have been nested together. Generally, thermoformed containers are nested for efficient shipping. Because thermoformed containers are manufactured of a single, essentially constant thickness sheet it is normally very hard to keep the nested containers from fitting into one another so tightly as to prevent their ready de-nesting. In particular, the bases 12 and side walls 14 may abut so closely as to prevent air flow between these surfaces, thus creating a vacuum when the containers are to be de-nested. Further, the cut lip 16 of the container (normally facing outward) may abut making it difficult to selectively grasp a single container for de-nesting.

As shown in FIG. 5, the present container 10 may be nested into a second identical container 10' which may in turn be nested into yet a third identical container 10". In this case, rather than the bases 12, 12' and 12" abutting, the depth of nesting of the containers is controlled by the interference between the ridges 20 and the cut lips 16 of the next lower container. By proper dimensioning of the ridges 20 and the cut lip 16, the amount of spacing between the containers 10, 10' and 10" may be precisely controlled to prevent two dense of nesting and to space bases 12 apart.

Figure 20:
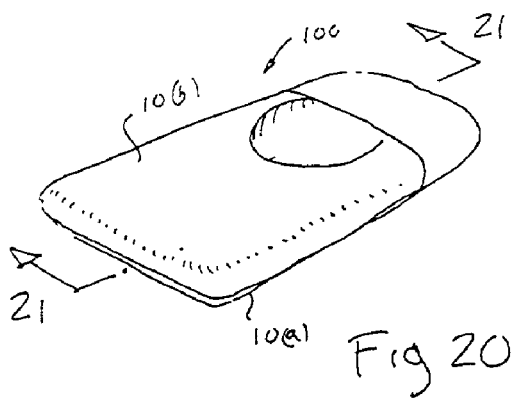
FIG. 20 is a front perspective view of a three-part container employing the techniques of the present invention.

Further, referring to FIG. 20, the ridges 20 may be shaped so that a generous gap 56 exists between adjacent containers (for example, 10' and 10") to permit a de-nesting pawl 58 to easily fit between containers 10 and 10' in the gap 56, for example, to provide compatibility with an automatic de-nesting device. Because dimensions 50 and 52 (shown in FIG. 2) and the shape of the ridges 20 are essentially independent, great flexibility in the amount of nesting may be obtained. Critical to this feature of the invention is that the ridge 20 have at least one wall obtusely angled with respect to an adjoining portion of the side wall 14 so as to be able to rest on the inwardly extending cut lip 16.

Referring now to FIG. 7, a first container 10(*a*) may provide a rectangular ridge 20 as viewed in cross-section, having a top and bottom radially extending wall generally parallel to the base 12 flanking a vertically extending wall generally perpendicular to the base 12. The cut lip 16 in this case is at the inner edge of the upper radially extending wall.

A second container 10(*b*) may be fabricated having a ridge 60 formed as a vertically extending wall 61 extending downward from a base 12(*b*), the base 12(*b*) and wall 61 abutting the upper radial wall and vertically extending wall of the ridge 20, respectively.

The lower extent of the vertical wall 61 may include an inwardly extending radial wall 62 terminating in a cut lip 16(*b*) and abutting the lower radial wall of the ridge 20.

A slight deformation of the thermoplastic material of the containers 10(*a*) and 10(*b*) permits this second container 10(*b*) to serve as a lid to container 10(*a*), ridge 60 snapping in place over ridge 20. The ability to precisely control the outer dimension of the ridge 20 and ridge 60 permits the interfitting of these containers 10(*a*) and 10(*b*) as shown. Note that the cut lips 16(*a*) and 16(*b*) need not be precisely located for sealing to occur between containers 10(*a*) and 10(*b*).

A cohesive or adhesive may be placed between ridge 20 and ridge 60; however, mechanical force will normally hold the containers 10(*a*) arid 10(*b*) together.

Referring to FIG. 8, containers 10(*a*) may instead employ ridge 20 and ridge 60 that are hemicircular in cross-section to provide a smoother contour of the ridges to assist in the snapping of the containers 10(*a*) and 10(*b*) together. Further, the radius of ridge 20 may be slightly greater than that inner radius of ridge 60 so as to eliminate play in a vertical direction. Similarly, the radius of the container 10(*b*) analogous to dimension 50 in FIG. 2 may be somewhat lest than that radius on container 10(*a*) to provide a tight seal, the difference in radius being accommodated by a slight unrolling of the ridge 60.

Referring to FIG. 9, conversely the ridge 20 of container 10(*a*) may be given a slightly smaller cross-sectional radius than the ridge 60 of container 10(*b*), and ridge 60 may be given an angular cross-section so as to promote contact between ridge 20 and ridge 60 at two rings of contact 63 at which a cohesive or adhesive may be placed to provide a double-sealing of the containers.

Referring to FIG. 10, the cut lip 16(*b*) of container 10(*b*) may extend vertically so as to provide a gap 64 between container 10(*a*) and 10(*b*), providing a purchase for a user's finger such as may assist in the separation of containers 10(*a*) and 10(*b*) once they are connected.

On the other hand, separation of the containers 10(*a*) and 10(*b*) may be intentionally made more difficult, for example, for the production of a tamper-proof container, by forming in the side wall 14(*a*) of container 10(*a*) a depressed terrace 66 displaced toward the center of container 10(*a*) by a distance substantially equal to the thickness of the sheet from which container 10(*b*) is formed. The terrace 66 is positioned near the cut lip 16(*b*) when the containers 10(*a*) and 10(*b*) are assembled, so that the terrace 66 causes the cut lip 16(*b*) to lie substantially flush with the side wall 14*a* to resist a catching of cut lip 16(*b*) to separate of the two containers.

Referring now to FIG. 12, a flexible tab 69 such as a cloth or plastic strip, may be attached to one of the containers 10(*a*) and 10(*b*) to extend outward between the ridge 20 and ridge 60 to be grasped by a user of the containers 10(*a*) and 10(*b*) and pulled to assist in separating these containers.

Separation of the containers may also be promoted by means of a cam disk 68 having an operator 70 protruding through an aperture 73 in the base 12(*b*) of container 10(*b*). The operator is accessible to a user and when rotated also rotates the cam disk 68 which is positioned on the inside of the closed containers 10(*a*) and 10(*b*), with a portion extending between ridge 20 and ridge 60. As the cam disk 68 is rotated, its thickness between ridge 20 and 60 increases, separating the two containers 10(*a*) and 10(*b*) without a pulling on the containers.

Referring now to FIG. 14, the upper radial wall of ridge 20 may include an upwardly extending embossment 72 providing a button which may protrude through an aperture 74 cut in the base 12(*b*) of container 10(*b*). The embossment 72 so formed may be pressed downward as indicated by arrow 75 by finger pressure while upward force indicated by arrow 76 may be exerted against the cut lip 16(*b*) of container 10(*b*), also by finger pressure. The result is that both containers may be pushed apart with a simple one-handed action, without the need for a firm grip, for example, on the lower container 10(*a*) as would be required for pulling container 10(*a*).

Referring now to FIG. 15, a three-part container may be constructed having a lower and upper container 10(*a*) and 10(*b*), respectively, locked together by means of ridges 60 and 20. A third container 10(*c*) is held between them and provides a ridge 78 just fitting into the inside of ridge 20. The container 10(*c*) has a side wall 14(*c*) which continues upward from ridge 78 across the cut lip 16(*a*)of container 10(*a*) and along the side wall 14(*b*) of container 10(*b*) to have its base 12(*c*) run parallel to base 12(*b*) of container 10(*b*). The base 12(*c*) may include one or more pockets 80 to contain product for display through a transparent container 10(*b*). The pockets 80 may conform to the product to arrange it for attractive display through the container 10(*b*).

Figure 16:
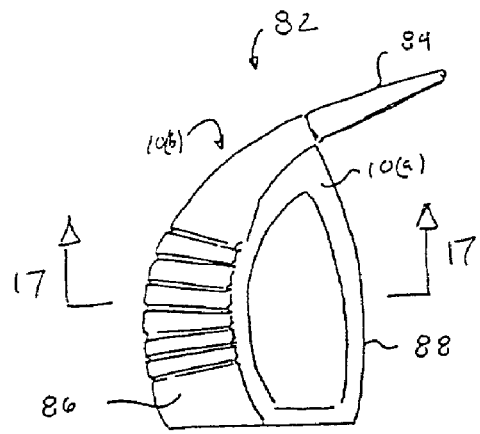
FIG. 16 is a front elevational view of an example container using the present techniques.
Figure 17:
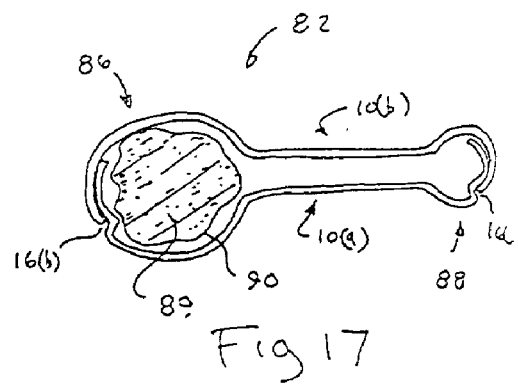
FIG. 17 is a cross-section through the container of FIG. 16 along line 17—17 showing the interfitting of two halves and an internal plastic liner.

Referring now to FIGS. 16 and 17, the containers 10(*a*) and 10(*b*) need not function as base and lid, but may form two halves of a general container such as a dispensing container 82 shown in FIG. 16. Such a container may have a front and rear face comprised of containers 10(*a*) and 10(*b*). A separately formed nozzle 84, which may be injection molded, can be attached to a hole formed in the containers 10(*a*) and 10(*b*), respectively.

Here, the containers 10(*a*) and 10(*b*) provide both a product storage volume 86 and a handle 88 and permit great flexibility in surface design and package dimension. Referring to the cross-section of FIG. 17, the halves 10(*a*) and 10(*b*) are assembled using the tamper-resistant joint generally described with respect to FIG. 11, where the cut lips 16(*b*) of container 10(*b*) rest in terraces created in container 10(*a*).

Product 89 contained within the container 82 may be held loosely in the container 82 or may be contained in a flexible plastic bag 90 as may be preferred for very fine powdered or liquid product 89.

Figure 18:
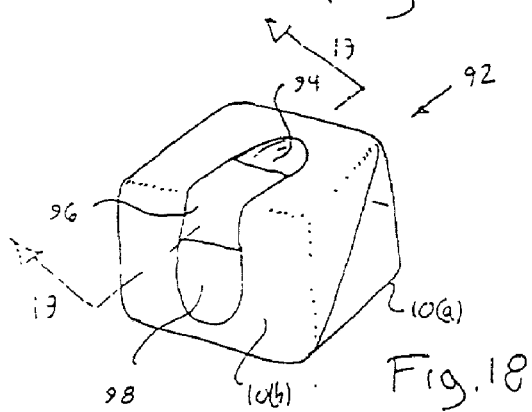
FIG. 18 is a front perspective view of a cubical container such as may be produced by the present technique.
Figure 19:
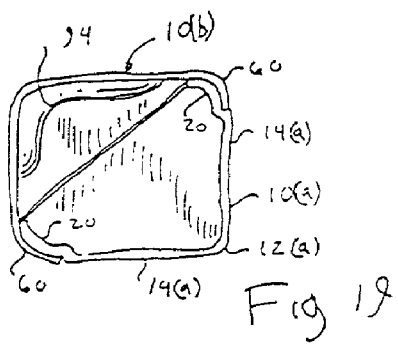
FIG. 19 is a cross-sectional view through the container of FIG. 18 alone lines 19—19 showing the interfitting of the container halves.

Referring now to FIGS. 18 and 19, containers 10(*a*) and 10(*b*) may together form a rectangular parallelepiped container 92 without external flanges. In this case, the division between containers 10(*a*) and 10(*b*) divides the parallelepiped along the diagonals of two opposed faces and follows edges of the other two pairs of faces.

Referring to the cross-sectional view of FIG. 19, container 10(*a*) has a base 12(*a*) that is simply the corner between two of the faces of the container 92 and the side walls 14(*a*) proceed upward at approximately 90° angles from each other. The ridges 20 and 60 fit together with the seam of FIG. 11 to provide corners between two of the faces.

In the embodiment shown, the container 92 may be adapted for use as a dispenser with a depression 94 formed in two of the faces of container 10(*b*) as may be covered by an "L" cap 96 fitting around the corner of the two faces and attached by an adhesive sticker at one side to provide a hinge 98. An aperture may be cut in the depression 94 underneath the "L" hinge 98 to provide access to products stored inside the volumes contained by halves 10(*a*) and 10(*b*).

Figure 21:
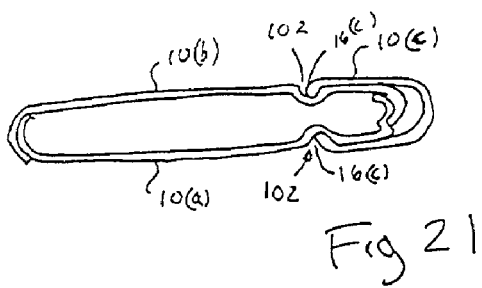
FIG. 21 is a cross-sectional view of the container of FIG. 20 along lines 21—21 showing the three elements of the container.

Referring now to FIGS. 20 and 21, a second three-part container may be formed where the third component provides not a product-supporting insert, but a cap holding the other 10 two components together. Specifically, shells 10(*a*) and 10(*b*) may be fit together as has been previously described. A ridge 102 providing a depression extending inward toward the volume contained by containers 10(*a*) and 10(*b*) may be formed in containers 10(*a*) and 10(*b*) so as to produce a channel running around the container 100 crossing both containers 10(*a*) and 10(*b*). A third container 10*c* in this case has inwardly extending cut lips 16(*c*) fitting into the channel formed by ridges 102 to cover an end of the combined containers 10(*a*) and 10(*b*), thereby serving to hold them together, the ridge 102 and cut lip 16(*c*) serving to hold the container 15(*c*) in place.

Referring now to FIGS. 22 and 23, the ability to produce a cut lip 16 facing inward toward the volume of the thermoformed container permits a dead hinge construction (i.e., a hinge without a flexure of the thermoplastic material) to be used. Here, a ridge 20 of container 10(*a*) is formed into a relatively large cylindrical form having hemicircular cross-section and conforming to an expanded ridge 60 on container 10(*b*). The cylindrical form may be bisected by a circular disk 104, integrally molded with ridge 20 and shown in dotted lines in FIG. 22. Ridge 20 including disk 104 and ridge 60 extend about the axis of their cylinders for greater than 180° to provide a hinging action where they retain their connection as the remaining portions of containers 10(*a*) and 10(*b*) are separated in rotation about the cylinder axis. The remaining opposite side of containers 10(*a*) and 10(*b*) form the hinge 104 of container 103 and may include the release mechanism described with respect to FIG. 14.

Referring now to FIGS. 24 and 25, a container 106 may be formed from a box shaped container 10 having a rectangular ridge 20 as was described with respect to FIG. 7 where the inwardly extending cut lip 16(*a*) extends only along three sides of the upper edge of the container 10. A paperboard or card stock backer plate 108 may be inserted beneath the radially inward extending cut lip 16, thereby being retained as a cover to container 10. The cardboard backer plate 108 may have downwardly extending ears 110 attached at opposite edges that will slide beneath cut lip 16. The ears may be folded upward as indicated by arrows 112 against the backer plate 108 so that the backer plate 108 may slide over the container 10 and beneath the radial upper edge leading to the cut lip 16 and then fold downward into the recess formed by ridge 20, thus preventing the backer plate 108 from sliding out again without significant effort.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

I claim:

1. A method of vacuum thermoforming a container which includes an outer surface including an outwardly-projecting ridge, the container further including a base, side walls, and an inwardly-projecting cut lip, the method comprising:
   (a) providing a three-part mold defining a cavity conforming in shape to the outer surface of the container, the cavity including an undercut portion corresponding to the ridge of the container, the mold including separable first, second and third portions, the first portion including a planar upper surface and an upper lip, the first portion defining an upper part of the undercut portion, the second portion defining a lower part of the undercut portion and further defining a surface corresponding to the side walls of the container, the first and second portions of the mold being separable along a part line located along the ridge of the container, the third portion defining a surface corresponding to the base of the container, the cavity being shaped so that the separated thermoplastic material is a shell having a base surrounded by integrally formed side walls extending upward to a cut lip, the walls and base formed of a single thermoplastic sheet and defining a volume, the side walls including a ridge below the cut lip, the ridge protruding away from the volume and being sized to support the shell on a lower surface of the ridge against a cut lip of a second identical shell with the bases of the two shells spaced apart when the shell is nested within the second identical shell, the cut lip extending inward about the volume;
   (b) positioning a heated sheet of thermoplastic material over the mold;
   (c) drawing the heated sheet of thermoplastic material over the upper lip of the mold and down into the cavity and into the undercut portion of the mold;
   (d) allowing the drawn thermoplastic material to cool below its glass transition temperature;
   (e) after said allowing, cutting the thermoplastic material along the upper lip of the mold to separate the drawn thermoplastic material in the mold cavity from the remainder of the thermoplastic material to produce the thermoformed container;
   (f) separating the first, second, and third portions of the mold whereby the second and third portions move downwardly away from the first portion until the third portion contacts an ejector plug, the second portion thereafter continuing downward until clear of the thermoformed container; and
   (g) removing the thermoformed container from the second and third portions of the mold.

2. The method of claim 1 wherein the cavity includes at least one ejector pin for pushing the formed thermoplastic material from the cavity prior to said removing.

3. The method of claim 1 wherein the cavity is shaped so that the ridge has at least one wall obtusely angled with respect to an adjoining portion of the side wall so that a gap is formed between ridges of the two shells when they are nested.

4. The method of claim 1 wherein the cavity is shaped so that the upwardly extending walls include a ridge below the cut lip, the ridge protruding away from the volume and extending around the entire periphery of the upwardly extending walls.

5. The method of claim 1 wherein said removing is between the first and second portions.

6. The method of claim 1 wherein said cutting is before said separating.

7. The method of claim 1 wherein said cutting is after said allowing.

8. A method of vacuum thermoforming a container which includes an outer surface including an outwardly-projecting ridge, a base, side walls, and an inwardly-projecting cut lip, the method comprising:

providing a three-part mold defining a cavity conforming in shape to the outer surface of the container, the cavity including an undercut portion corresponding to the ridge of the container, the mold including separable first, second and third portions, the first portion including a planar upper surface and an upper lip, the first portion defining an upper part of the undercut portion, the second portion defining a lower part of the undercut portion and further defining a surface corresponding to the side walls of the container, the first and second portions of the mold being separable along a part line located along the ridge of the container, the third portion defining a surface corresponding to the base of the container, the cavity being shaped so that the separated thermoplastic material is a shell having a base surrounded by integrally formed side walls extending upward to a cut lip, the walls and base formed of a single thermoplastic sheet and defining a volume, the side walls including a ridge below the cut lip, the ridge protruding away from the volume and being sized to support the shell on a lower surface of the ridge against a cut lip of a second identical shell with the bases of the two shells spaced apart when the shell is nested within the second identical shell, the cut lip extending inward about the volume;

positioning a heated sheet of thermoplastic material over the mold;

drawing the heated sheet of thermoplastic material over the mold and into the cavity and into the undercut portion of the mold;

allowing the drawn thermoplastic material to cool below its glass transition temperature;

after said allowing, cutting the cooled thermoplastic material along the upper lip of the mold to separate the drawn thermoplastic material in the mold cavity from the remainder of the thermoplastic material;

separating the first, second, and third portions of the mold whereby the second and third portions move downwardly away from the first portion until the third portion contacts an ejector plug, the second portion thereafter continuing downward until clear of the thermoformed container; and removing the thermoformed container from the second and third portions of the mold.

9. The method of claim 8 wherein said cutting is before said separating.

* * * * *